United States Patent
Hartman et al.

(10) Patent No.: US 10,443,699 B2
(45) Date of Patent: Oct. 15, 2019

(54) HYDRAULIC TORQUE CONVERTER FOR WORK MACHINE

(71) Applicant: CNH Industrial America LLC, New Holland, PA (US)

(72) Inventors: Brian Hartman, Valparaiso, IN (US); Alek Czernobil, Lemont, IL (US); Chaitanya Gorantiwar, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/606,618

(22) Filed: May 26, 2017

(65) Prior Publication Data

US 2018/0340599 A1 Nov. 29, 2018

(51) Int. Cl.
| | | |
|---|---|---|
| E02F 3/28 | (2006.01) | |
| F16H 45/02 | (2006.01) | |
| F16H 61/14 | (2006.01) | |
| F16H 59/46 | (2006.01) | |

(52) U.S. Cl.
CPC ........... F16H 45/02 (2013.01); F16H 61/143 (2013.01); *E02F 3/28* (2013.01); *F16H 2059/467* (2013.01); *F16H 2061/145* (2013.01); *F16N 2210/04* (2013.01); *F16N 2250/08* (2013.01)

(58) Field of Classification Search
CPC .. F16H 45/02; F16H 61/142; F16H 2061/145; F16H 2059/467; F16N 2250/08; E02F 3/28
See application file for complete search history.

(56) References Cited

U.S. PATENT DOCUMENTS

| | | | |
|---|---|---|---|
| 4,577,737 A | 3/1986 | Niikura et al. | |
| 5,609,551 A | 3/1997 | Sakai | |
| 5,683,327 A | 11/1997 | Inuzuka et al. | |
| 6,183,389 B1 | 2/2001 | Tabata | |
| 6,231,480 B1 | 5/2001 | Sasaki | |
| 6,565,483 B2 | 5/2003 | Segawa et al. | |
| 6,942,598 B2 | 9/2005 | Kondo et al. | |
| 8,100,804 B2 | 1/2012 | Nishimine et al. | |
| 8,202,197 B2 | 6/2012 | Ogata et al. | |
| 8,226,532 B2 | 7/2012 | Okumoto et al. | |
| 8,960,395 B2 * | 2/2015 | Waters | F16H 45/02 192/12 C |
| 9,958,060 B2 * | 5/2018 | Boston | F16H 61/14 |
| 2012/0199371 A1 * | 8/2012 | Sakai | E02F 9/2246 172/3 |
| 2013/0144496 A1 * | 6/2013 | Takeshima | E02F 3/964 701/50 |
| 2015/0198242 A1 * | 7/2015 | Knox | F16H 61/14 477/64 |
| 2017/0204968 A1 * | 7/2017 | Honma | F16H 61/143 |
| 2018/0086345 A1 * | 3/2018 | Nakamura | B60W 10/026 |

* cited by examiner

*Primary Examiner* — David J Hlavka
(74) *Attorney, Agent, or Firm* — Peter K. Zacharias; Patrick M. Sheldrake

(57) ABSTRACT

A loader backhoe work machine in which a power unit is coupled to a power train through a torque convertor. The torque convertor incorporates a lock up clutch to enable more efficient operation of the work machine in a transport mode while retaining the torque multiplication feature during the loading and/or backhoe operations. The control system for the lock up clutch senses selected engine and system operating parameters to engage the lock up clutch only when those sensors indicate a transport operating condition.

16 Claims, 3 Drawing Sheets

HYDRAULIC TORQUE CONVERTER FOR WORK MACHINE

BACKGROUND OF THE EMBODIMENT

1. Field of the Embodiment

The present embodiment relates to work machines, and more specifically to such machines that have hydraulic torque converters incorporated therein.

2. Description of the Related Art

One of the most useful and popular work machines, particularly in the construction field, is a loader backhoe work machine. When a tractor is the selected work machine, it is commonly referred to as a TLB (tractor loader backhoe). When operating under the loading function, machines of this type elevate, transport and unload granular material, soil or other items. In this function, the primary power unit for the device is used for work machine movement along the ground, as well as powering the hydraulic actuators used to elevate and unload material. In the backhoe function, the machine is essentially stationary and the backhoe is used to penetrate the ground, removing scoops of soil and then moving it without the work machine being transported across the ground.

One of the key elements incorporated in the power train of a TLB is a torque convertor. This enables the TLB, under work conditions when the TLB is either excavating or lifting a load, to multiply the torque output of the power unit in the TLB. While the torque convertor enables increased torque output under work conditions, it typically suffers from a reduction in fuel efficiency, particularly when the TLB is used in a transport mode between excavation jobs or while transporting loaded material.

The automotive field adds lock up clutches in torque convertors of automatic transmissions to enable an increase in fuel efficiency. However, this application is for light duty torque levels compared to the work machine environment.

Accordingly, what is needed in the art is a system that enables incorporation of a lock up clutch in a heavy duty work machine environment.

SUMMARY OF THE EMBODIMENT

The present embodiment provides the successful application of a lockup clutch in a hydraulic torque converter in a work machine.

In one form, the embodiment is a work machine adapted for a work cycle operating auxiliary equipment at high torque load and a transport mode at a lower torque mode. The work machine has ground support wheels for guiding the work machine over the ground. A power unit produces a rotary power output of high torque during the work mode and a lesser torque output during transport mode. A heavy duty power train interconnects the output of the power unit to at least one of the ground support wheels, the power train including a hydraulic torque convertor and a clutch operable upon the receipt of a control signal to lock up the hydraulic torque convertor. A control system is configurable to generate the lock up signal at least when the work machine is in a transport mode.

In another form, the embodiment is a method for operating a lock up clutch of a work machine adapted for a work mode operating auxiliary equipment at load and a transport mode and having a hydraulic torque convertor and a lock up clutch to selectively lock up the torque convertor. The method includes the steps of engaging the lock up clutch when said work machine is in a transport mode.

An advantage of the present embodiment is the ability to multiply torque output of a work machine during a work mode while at the same time enabling greater fuel economy in a transport mode.

Another advantage of the present embodiment is that the engagement of the lock up clutch is automatic depending upon system operating parameters.

BRIEF DESCRIPTION OF THE DRAWINGS

The above-mentioned and other features and advantages of this embodiment, and the manner of attaining them, will become more apparent and the embodiment will be better understood by reference to the following description of an embodiment of the embodiment taken in conjunction with the accompanying drawings, wherein.

Corresponding reference characters indicate corresponding parts throughout the several views. The exemplification set out herein illustrates one embodiment of the embodiment and such exemplification is not to be construed as limiting the scope of the embodiment in any manner.

DETAILED DESCRIPTION OF THE EMBODIMENT

Figure 1:
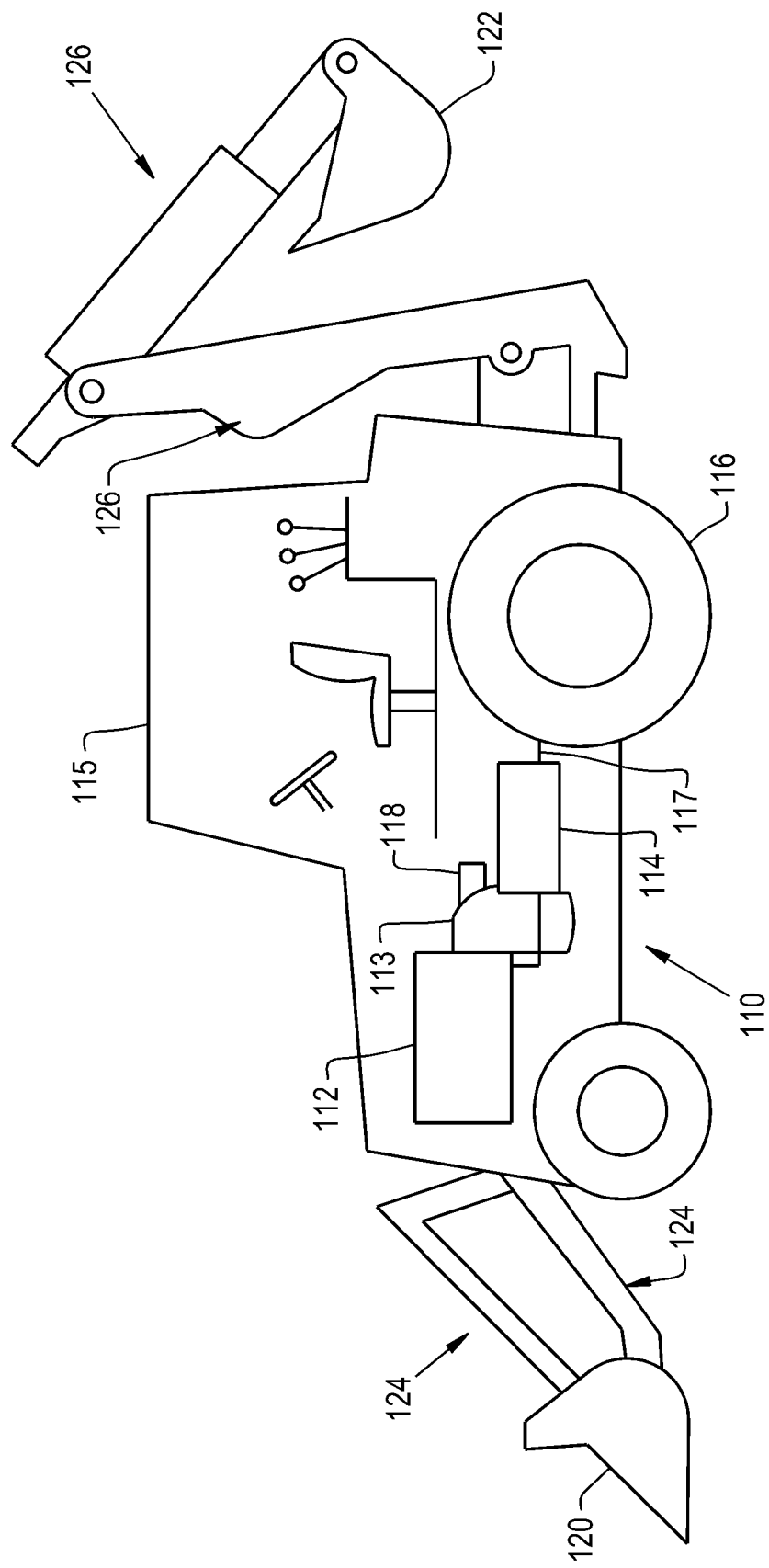
FIG. 1 is a side view of a work machine such as a TLB, showing a hydraulic system in schematic form incorporating the present embodiment.

Referring now to the drawings, and more particularly to FIG. 1, there is shown a work machine 110 which is illustrated as a loader backhoe work machine, in accordance with an exemplary embodiment of the present invention. The work machine 110 is also known as a TLB or tractor loader backhoe. Work machine 110 has a power unit, usually in the form of a diesel engine 112, owing to its fuel economy and available torque output. A heavy duty power train 114 incorporates a transmission, such as a multispeed transmission (for example a 4 speed transmission), driven by power unit 112 through a torque convertor 113 and transmitting power to ground drive wheels 116, through mechanical interconnections illustrated at 117. As described below, torque convertor 113 is a hydraulic coupling that incorporates a lockup clutch, shown schematically at 118, to selectively mechanically connect the input from the power unit 112 to the output leading to the power train 114. An operator cab 115 is provided for control of the work machine 110.

A loading bucket 120 is provided at the front end of the work machine 110 and a backhoe 122 is provided at the rearward end of the work machine 110. Both bucket 120 and backhoe 122 are mounted on articulated arms 124, 126, respectively to perform functions normally associated with these components. The details of the articulated arms 124, 126 and mechanical interconnections are omitted to enable a clearer focus on the present embodiment.

Figure 2:
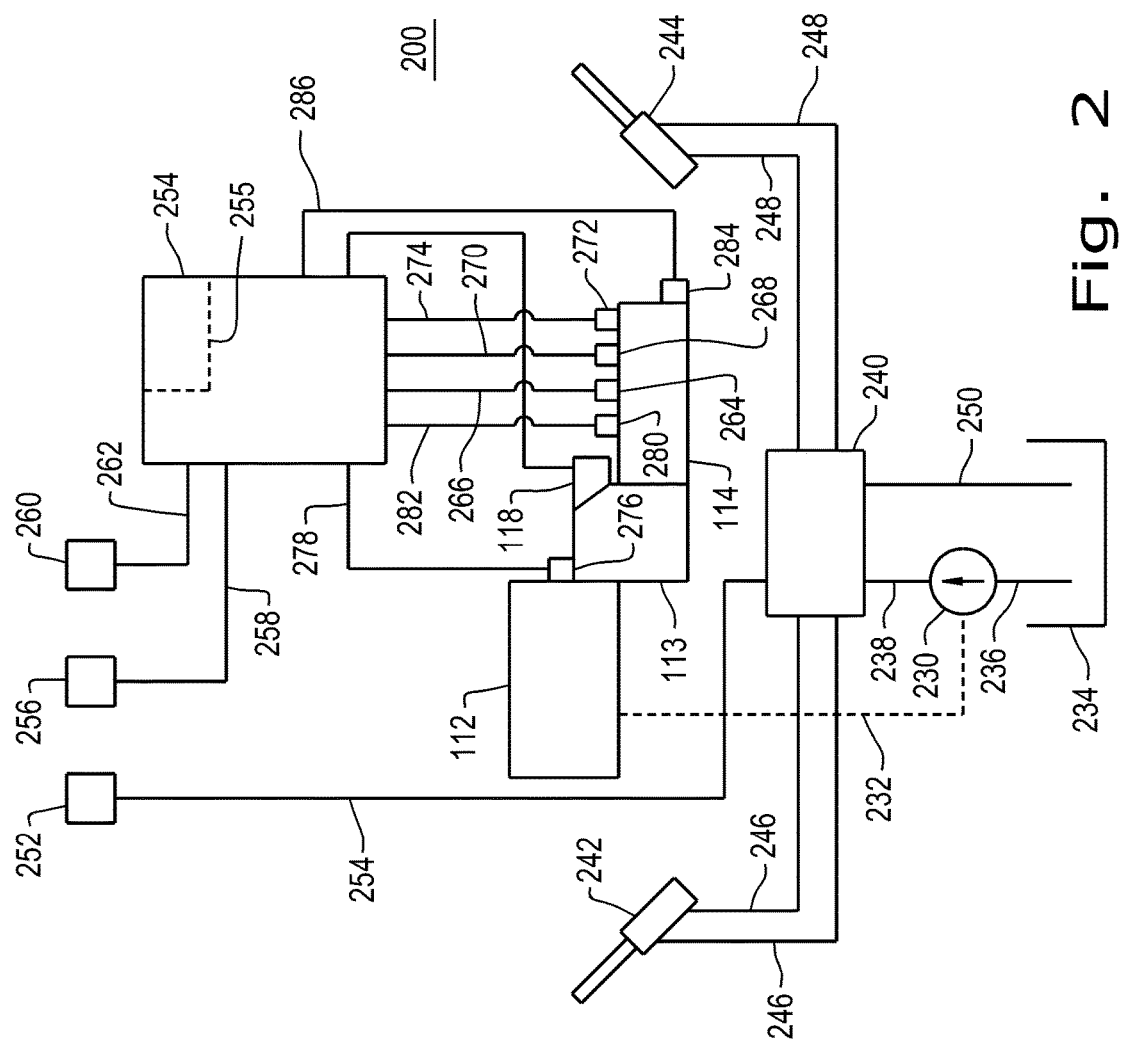
FIG. 2 is an enlarged fragmentary view of a portion of the hydraulic and control system of FIG. 1; and, FIG. 3 is a block diagram showing the logic steps for engaging a lockup clutch.

The bucket 120 and backhoe 122 are manipulated through a hydraulic actuation system 200, shown in FIG. 2, including a hydraulic pump 230, shown as a gear pump, driven from engine 112 by a mechanical connection 232 and receiving hydraulic fluid from a suitable reservoir 234 through an inlet line 236. An output line 238 receives pressurized liquid from pump 230 and passes it through a hydraulic control system 240 for controlling the bucket 120 and backhoe 122 functions. Hydraulic control system 240 directs pressurized fluid to bucket actuator 242 and backhoe actuator 244 through lines 246 and 248, respectively. Return flow from hydraulic control system passes through line 250 to reservoir 226.

Articulated arms 124 for bucket 120 are acted on by actuator 242 in response to pressurized fluid controlled by hydraulic control system 240. Articulated arms 126 for backhoe 122 are manipulated by actuator 244 receiving inputs from hydraulic control system 240.

The mechanical interconnections between the actuators 242 and 244 and articulated arms 124 and 126, respectively are not shown to enable a clearer understanding of the present embodiment. The control for the actuators is provided by a series of operator levers schematically shown at 252 and interconnected to hydraulic control system 240 by line 254. Operator controls 252 are located in the cab 115. During operation of the bucket 120 or backhoe 122, a high torque output is available because of torque convertor 113. However, the present embodiment enables a more efficient operation during a transport when high torque outputs are not required.

Figure 3:
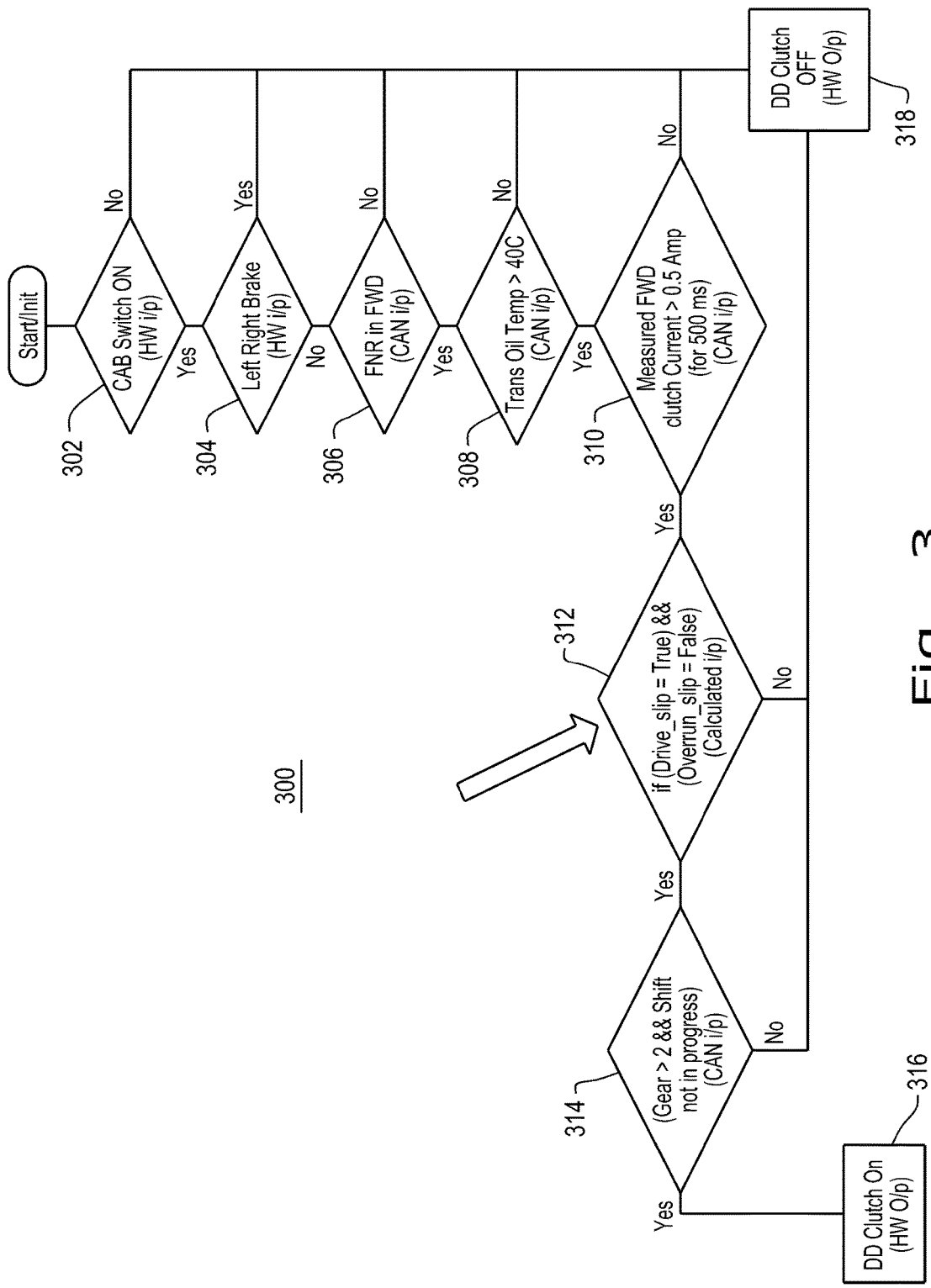

A control system 200 for lock up clutch 118 is illustrated in FIG. 2 to show the physical arrangements of the system and it is shown in a method or logic sequence 300 illustrated in FIG. 3. Referring now to FIG. 2, an electronic control unit 254, with a memory component 255, is shown, in accordance with an exemplary embodiment of the present invention. Although electronic control unit 254 is illustrated as a standalone unit, the control functions may also be as an extension of the electronic control unit 254 for engine 112 or as a fully integrated function. So too can the memory component 255 be implemented as discussed below in paragraph 0027 below. Electronic control unit 254 receives signal inputs from the sensors an components set forth below to make the determinations in the steps discussed in the method of 300.

Electronic control unit 254 receives a first input from an on/off switch 256 located in cab 115 through line 258. A second input is a sensor 260 which generates a signal through line 262 to electronic control unit 254 reflecting whether the park brakes (not shown) for work machine 110 are on or off. A sensor 264 in the transmission of power train 114 generates a signal reflecting whether the power train 114 is in a configuration for forward motion of work machine 110. The signal from sensor 264 is fed to electronic control unit 254 via line 266. A temperature sensor 268 measures the temperature of the oil used to lubricate the transmission in power train 114 and sends an enabling signal to electronic control unit 254 via line 270 whenever the lubricant temperature is above a given level, for example 40° C. Another sensor 272 generates a signal reflecting whether a forward motion clutch current is above a given level so as to ensure a forward motion configuration of work machine 110. The signal from sensor 272 is passed to electronic control unit 254 by line 274.

A sensor 276 generates a signal reflecting the RPM of engine 112 and the signal is sent to electronic control unit 254 through line 278. A second RPM sensor 280 generates a signal reflecting the input RPM to the transmission of power train 114 and this signal is sent to electronic control unit 254 via line 282. Still another sensor 284 reflects whether the transmission of the power train is in greater than second gear. This signal is sent to the electronic control unit 254 via line 286. The signal indicating which gear the transmission of power train 114 is in may be any one of a number including measuring input and output RPM ratio of the transmission of power train 114.

When the work machine 110 is operated as a loader during which it manipulates the bucket 120, the power train 114 also receives power from power unit 112 to drive ground wheels 116 and move the work machine 110 along the ground. When the backhoe function is employed, backhoe 122 is the only component being manipulated so that greater power is available to perform the functions of a backhoe including digging into soil.

The torque convertor 113 advantageously multiplies torque when the work machine 110 is in the work condition. While this provides added torque, it does so at a reduction of fuel economy. The control system set forth in FIG. 2 with the function described in FIG. 3 enables the lock up clutch 118 to be advantageously engaged in a transport mode thus increasing fuel economy.

Referring now to FIG. 3, there is illustrate a method, generally designated as 300, for enabling engagement of the lock up clutch 118, in accordance with an embodiment of the present invention. Initially the operator cab switch 256 must be in an on position, as shown at 302 and then the park brakes must be off as controlled by switch 260, as shown at 302. The directional control as sensed by sensor 264 should indicate a forward motion, as shown at 304 and the transmission oil temperature from sensor 268 should indicate a temperature above the threshold discussed above, as shown at 306. In addition, the measured forward clutch current in the transmission of the power train 114 should be above a given amperage, for example 0.5 amps measured by sensor 272, as shown at 308. Then, when the slip of the torque convertor 113 as measured by the ratio of the transmission input RPM as measured by sensor 280 over the engine RPM sensor 276 is within a given range so that engagement of the lockup clutch 118 does not produce a significant variation in relative RPM, as shown at 310. An example of such a ratio would be for an increasing ratio of between 0.7 and 0.8 up to 1.05 the clutch may be engaged. Conversely for a decreasing ratio the ratio would go on when the ratio is below 0.95. Lastly, the sensors 280 and 284 measuring the ratio of the transmission would indicate that the shifter is in above the second of the four speed gears for the transmission of the power train 114 and that a shift is not in progress, as shown at 312. At that point, the electronic control unit 254 sends a signal, usually in the form of an electrical signal to the lock up clutch 118 to fully engage the lock up clutch, as shown at 314. In the absence of any one of these conditions, the electronic controller 254 sends a control signal to the lockup clutch 118 to disengage it, as shown at 318.

It is to be understood that the steps of the method 300 are performed by the electronic control unit 254 upon loading and executing software code or instructions which are tangibly stored on a tangible computer readable medium 255, such as on a magnetic medium, e.g., a computer hard drive, an optical medium, e.g., an optical disc, solid-state memory, e.g., flash memory, or other storage media known in the art. Thus, any of the functionality performed by the electronic control unit 254 described herein, such as the method 300, is implemented in software code or instructions which are tangibly stored on a tangible computer readable medium. Upon loading and executing such software code or instructions by the control unit 254, the electronic control unit 254 may perform any of the functionality of the electronic control unit 254 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

The control system indicated above is substantially seamless and enables the operator to conduct normal load and transport operations while not having to focus on conditions enabling the lock up clutch 118 to be engaged. Furthermore, the system allows for the incorporation of the lock up clutch with a minimum of additional control apparatus and a complication with the associated expense.

While this embodiment has been described with respect to at least one embodiment, the present embodiment can be further modified within the spirit and scope of this disclosure. This application is therefore intended to cover any variations, uses, or adaptations of the embodiment using its general principles. Further, this application is intended to cover such departures from the present disclosure as come within known or customary practice in the art to which this embodiment pertains and which fall within the limits of the appended claims.

What is claimed is:

1. A work machine adapted for a work mode operating auxiliary equipment and a transport mode, the work machine comprising:
    a chassis;
    ground support wheels for guiding the work machine over a ground surface;
    a power unit comprising an output, the power unit configured to produce, at the output, rotary power of high torque during the work mode and at a lesser torque during the transport mode;
    a heavy duty power train interconnecting the output of the power unit to at least one of the ground support wheels, the power train comprising a hydraulic torque convertor and a clutch operable upon receipt of a control signal to lock up the hydraulic torque convertor; and,
    a control system configured to generate the control signal based on whether the work machine is in the transport mode.

2. The work machine as claimed in claim 1, wherein the power train has a forward condition and a reverse condition for driving the work machine selectively forward and reverse, respectively, and the control system is configured to generate the control signal further based on whether the power train is in the forward condition.

3. The work machine as claimed in claim 1, wherein the power train further comprises a multi gear transmission, and the control system is configured to generate the control signal further based on whether the power train is in greater than a second gear.

4. The work machine as claimed in claim 3, wherein the transmission of the power train has four gears.

5. The work machine as claimed in claim 1, wherein the power train further comprises an oil lubricated transmission, and the control system is configured to generate the control signal further based on whether an oil temperature of the transmission is greater than a predetermined value.

6. The work machine as claimed in claim 5, wherein the predetermined value is 40° C.

7. The work machine as claimed in claim 1, wherein the work machine further comprises at least one park brake, and the control system is configured to generate the control signal further based on whether the at least one park brake is off.

8. The work machine as claimed in claim 7, wherein the work machine has a plurality of park brakes and the control system is configured to generate the control signal further based on whether all the park brakes are off.

9. The work machine as claimed in claim 1, wherein the control system determines a ratio between engine RPM and transmission input RPM as a measure of slip, and the control system is configured to generate the control signal further based on whether the slip is above a predetermined value.

10. The work machine as claimed in claim 9, wherein the predetermined value is 0.8.

11. The work machine as claimed in claim 2, wherein the power train further comprises a multi gear transmission, and wherein the transmission has oil lubrication, and wherein the work machine further comprises at least one park brake, and wherein the control system is further configured to determine a ratio between an engine RPM and a transmission input RPM as a measure of slip, and wherein the control system is configured to generate the control signal further based on whether:
    the power train is in a gear greater than a second gear,
    an oil temperature of the transmission as greater than a predetermined value,
    the at least one park brake is off, and
    the slip is within a predetermined range.

12. A method for operating a lock up clutch of a work machine adapted for a work mode operating auxiliary equipment at high torque loads and a transport mode of lower torque loads and comprising a hydraulic torque convertor and a lock up clutch to selectively lock up the torque convertor, the method comprising a step of engaging the lock up clutch based on whether the work machine is in a transport mode.

13. The method as claimed in claim 12, wherein the work equipment further comprises a power train, wherein the power train comprises a multi gear transmission, and wherein the step of engaging is further based on whether the transmission is in a gear greater than a second gear.

14. The method as claimed in claim 12, wherein the transmission has oil lubrication, and wherein the step of engaging is further based on whether an oil temperature is above a predetermined value.

15. The method as claimed in claim 12, wherein the work machine further comprises at least one park brake, and wherein the step of engaging is further based on whether the at least one park brake is off.

16. The method as claimed in claim 12, further comprising a step of determining an engine output RPM and a transmission input RPM, wherein the step of engaging is further based on whether a ratio of the transmission input RPM to engine output RPM is above a predetermined value.

* * * * *